United States Patent [19]
Hay et al.

[11] 3,766,470
[45] Oct. 16, 1973

[54] APPARATUS FOR TESTING THE INTEGRITY OF A THRU-HOLE PLATING IN CIRCUIT BOARD WORKPIECES OR THE LIKE BY MEASURING THE EFFECTIVE THICKNESS THEREOF

[75] Inventors: William D. Hay, Peekskill; Robert Jensen, Jamaica, both of N.Y.

[73] Assignee: Unit Process Assemblies, Inc., Woodside, N.J.

[22] Filed: May 24, 1971

[21] Appl. No.: 146,256

[52] U.S. Cl. .............................................. 324/64
[51] Int. Cl. ............................................ G01r 27/14
[58] Field of Search ................ 324/64, 71 R, 158 P, 324/158 F

[56] References Cited
UNITED STATES PATENTS
| | | | |
|---|---|---|---|
| 2,142,619 | 1/1939 | Sciaky | 324/64 |
| 3,207,981 | 9/1965 | Marsh et al. | 324/64 X |

FOREIGN PATENTS OR APPLICATIONS
| | | | |
|---|---|---|---|
| 371,998 | 3/1923 | Germany | 324/64 |
| 569,174 | 1/1933 | Germany | 324/64 |
| 250,321 | 6/1970 | U.S.S.R. | 324/64 |

OTHER PUBLICATIONS
Curtis et al., 4–Point Probe Measurement, IBM Technical Disclosure Bulletin, Nov. 1970, p. 1697.

*Primary Examiner*—Stanley T. Krawczewicz
*Attorney*—Robert E. Isner and Peter J. Franco

[57] ABSTRACT

An apparatus is provided for testing the integrity of thru-hole plating in printed circuit boards by measuring the effective thickness thereof. A printed circuit board is adapted to be positioned on a work surface of the apparatus with the plated thru-hole to be measured disposed at an operating location. A spaced pair of electrode probe are displaced downwardly along a predetermined path into engagement with the top defining edges of the plated thru-hole. A second spaced pair of electrode probe elements engage the bottom defining edges of the thru-hole whereby a predetermined magnitude of constant current can be passed through one of the upper electrode probes, the plating and one of the lower electrode probes and the voltage drop developed thereby across the thru-hole plating measured by the other set of upper and lower electrode probe elements. The upper and lower electrode probes are suitably contoured to establish essentially point contact with the surfaces of the thru-hole plating whereby accurate and reproducible readings can be obtained.

11 Claims, 12 Drawing Figures

INVENTORS
WILLIAM D. HAY
ROBERT JENSEN
BY
ATTORNEY

PRIOR ART

Fig. 12

INVENTORS
WILLIAM D. HAY
BY   ROBERT JENSEN

ATTORNEY

APPARATUS FOR TESTING THE INTEGRITY OF A THRU-HOLE PLATING IN CIRCUIT BOARD WORKPIECES OR THE LIKE BY MEASURING THE EFFECTIVE THICKNESS THEREOF

This invention relates to instruments for measuring the conductivity or thickness of thin layers or coatings of electrically conductive material, and particularly to instruments for measuring the plating thickness or conductivity of electrically conductive materials on the side walls of thru-holes in printed circuit boards.

Beta ray backscatter measuring instruments have been extensively utilized to measure the thicknesses of metallic deposits and coatings of various materials. These instruments generally include a source of beta radiation, conveniently a radioactive isotope. This source emits radiation which is directed to strike a metallic coating and the radiation backscattered from the coating is measured by a detector in the form of a Geiger-Muller tube. An associated electronic counter or readout unit converts the output of the detector into utilizable intelligence. Such beta ray backscatter measuring instruments cannot be used for measuring the thickness of the plating in a thru-hole in a printed circuit board where one base plating has an over plating of gold or solder. Additionally, such beta-ray backscatter measuring instruments are unable to detect cracks, voids, or other defects in the plated coating.

The present invention may be briefly described as an apparatus for non-destructive measurement of the physical integrity and thickness of plated coatings on thru-holes in printed circuit boards by micro-resistance measurement techniques. Upper and lower pairs of elements are displaced into engagement with the top and bottom surfaces of a plated thru-hole. A predetermined amount of current is passed through one of the upper electrode elements, the plating on the thru-hole and one of the lower electrode elements and the voltage drop developed as a result of the passage of current across the thru-hole plating is measured by the other upper and lower electrode elements.

Among the advantages of the present invention is the provision of an improved apparatus for measuring the thickness of thru-hole plating in printed circuit boards as well as providing an indication of the physical integrity thereof.

Accordingly, the principle object of the present invention is the provision of an improved apparatus for non-destructively measuring the thickness of thru-hole plating in printed circuit boards.

Another object of the present invention is the provision of an apparatus which can reliably indicate the integrity and thickness of copper plating in a thru-hole even in the presence of overplatings of gold or tin-lead.

A further object of the present invention is the provision of an apparatus which can detect cracks, voids, the presence of bath contaminants and other defects in printed circuit board thru-hole platings.

Other objects and advantages of the subject invention will become apparent from the following portion of the specification and from the accompanying drawings which illustrate in accord with the mandate of the patent statutes presently preferred embodiments incorporating the principles of the present invention.

Referring to the drawings.

Figure 1:
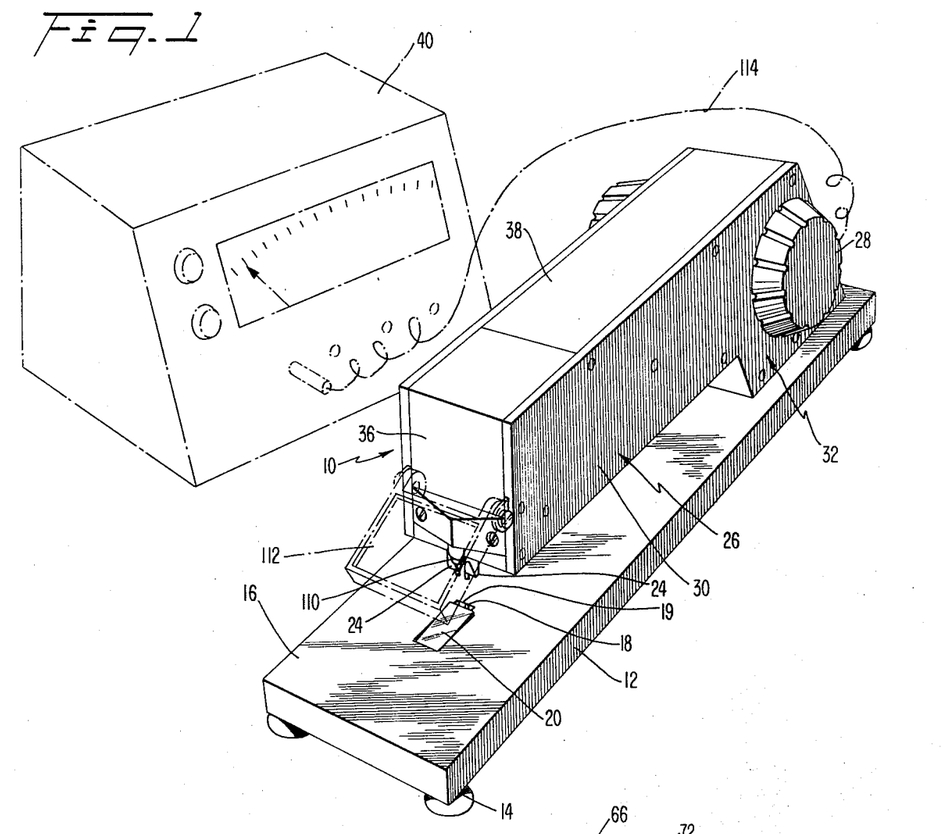
FIG. 1 is an oblique view of the apparatus incorporating the present invention.

Referring to the drawings and initially to FIG. 1 there is provided an apparatus 10 for measuring the effective thickness and for sensing defects in the plated coatings of plated thru-holes in printed circuit boards. As there shown, the apparatus 10 includes an elongate rectangular base member 12 supported on corner pedestals 14 which provides a horizontal workpiece supporting surface 16. A pair of spaced lower electrode elements 18 are biased to project upwardly through an aperture 19 in the base member 12 above the plane of the surface thereof and to define an operating location. A printed circuit board (not here shown) is positioned on the work surface and is supported by the work surface and by an ease-on ramp 20 which is biased to project upwardly from the work surface a distance which is sufficient to prevent the striking of the lower electrode elements by the printed circuit board when it is positioned on the work surface. The printed circuit board is positioned with a plated thru-hole to be measured disposed above the lower pair of electrode elements. An upper pair of electrode elements 24 are vertically displaceable in an elongated housing 26. When the control knobs 28 are rotated these electrode elements are vertically lowered and are thereby brought into engagement with the top surface of the thru-hole plating. Further lowering of the spaced probes results in the ease-on ramp, which is normally biased to project upwardly beyond the work surface, being forced downwardly. As the ease-on ramp is displaced downwardly the lower surface of the thru-hole plating engages the lower electrode pair (unless the weight of the circuit board is sufficient to lower the ramp bringing the circuit board into engagement with the lower electrode element prior to the lowering of the upper electrode elements) and further lowering of the upper electrode pair forces the workpiece, ease-on ramp and lower electrode pair downwardly until the workpiece is biased into planar engagement with the work surface. The workpiece is accordingly pinched between the opposing pairs of electrode elements thus assuring excellent contact between the upper pair of electrode elements 22 and the top surface of the thru-hole and electrode elements 18 and the lower surface of the thru-hole plating being tested.

Figure 2:
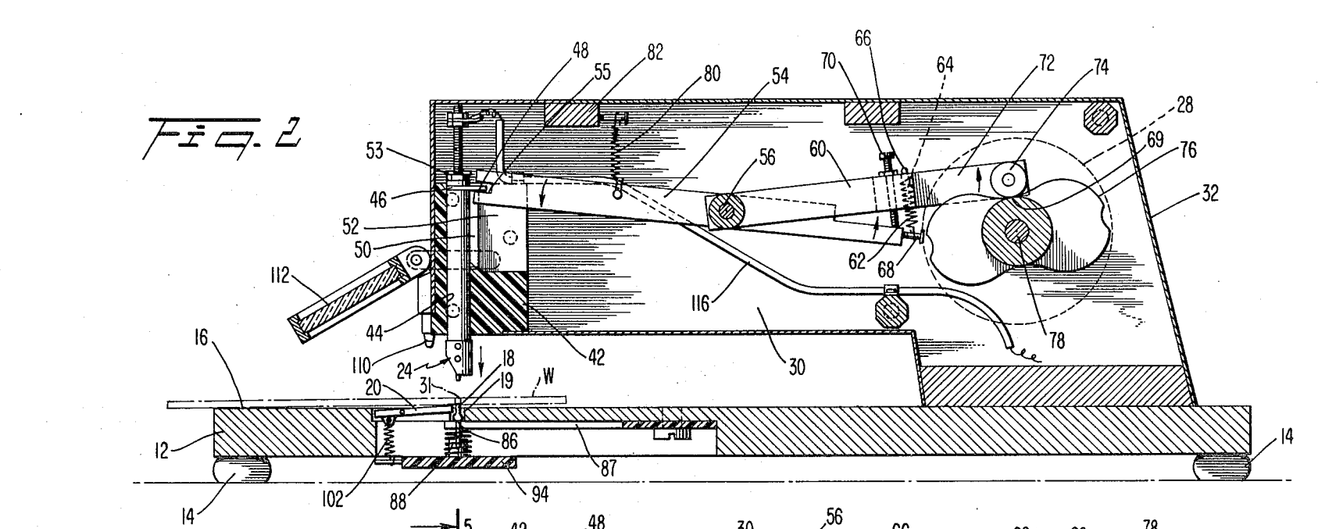
FIG. 2 is a longitudinal section taken at the lines 2—2 of FIG. 3.
Figure 3:
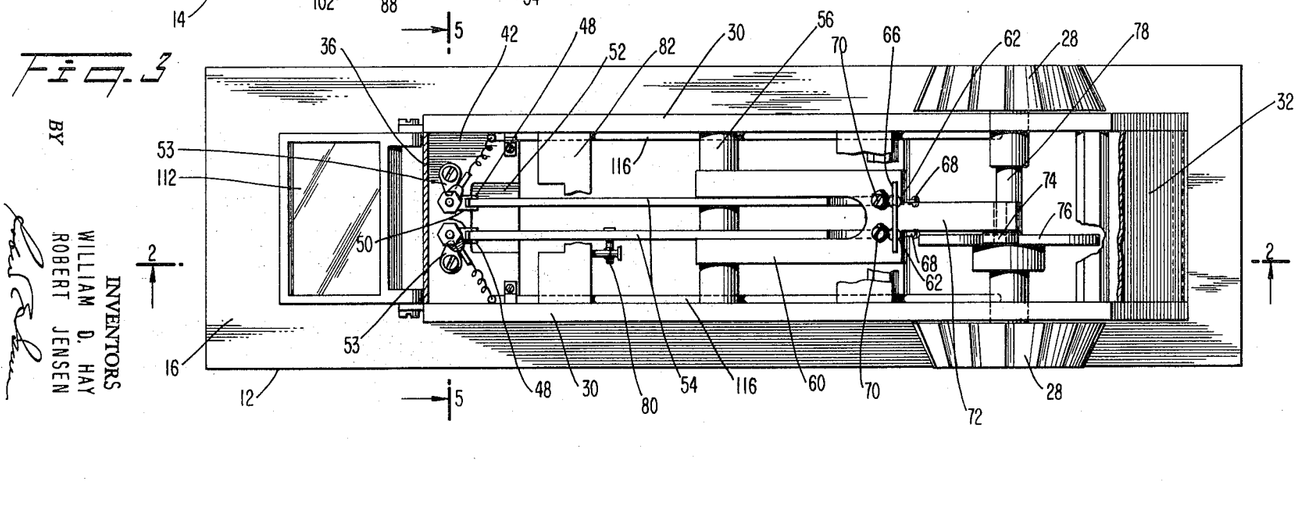
FIG. 3 is a plan view of the apparatus illustrated in FIG. 1 shown with the top cover plate removed.

The elongated housing 26 is mounted to the back of the base 12 and extends along the base in raised relation therewith to define a work space therebetween open at the sides and front. The housing includes laterally spaced side walls 30 which have depending extensions 32 at the back thereof, a back wall 34 (FIG. 2) which extends between the side walls 30 and removable cover plates 36, 38 which enclose the top and front end portions of the housing.

The testing apparatus is electrically connected to a readout unit or meter 40 which supplies current to the apparatus which passes through one set of upper and lower electrode elements. The voltage drop across the thru-hole plating developed as a result of the passage of current therethrough is measured by the second set of upper and lower electrode elements and converted by the readout unit into utilizable intelligence.

A guide body 42, (FIGS. 2 through 5) which may be made from metal, synthetic resin or any other suitable material, extends between the front end portions of the apparatus side walls 30. The guide body has a pair of spaced parallel bores 44 which extend vertically from the top surface to the bottom surface thereof. The upper pair of electrode elements 24, which are cylindrical in shape, are inserted into these bores and establish sliding engagement therewith.

A guiding element 46 is secured in a conventional manner to the uppermost portion of each of the upper electrode elements. These guilding elements, when so secured, have rectangularly shaped projections 48 which are located within vertical channels 50 defined in the guide body and which communicate on either side thereof with the guide body bores 44 and a guide body chamber 52. These rectangular projections establish a sliding relationship with the vertical channels 50 and accordingly prevent the rotational displacement of the upper electrode elements once they are inserted into the cylindrical guide body bores. A pair of stops 53 limit the upward displacement of these electrode elements.

The vertical displacement of the upper electrode elements is controlled by levers 54 which are rockable intermediate their ends on a shaft 56 which horizontally extends between the housing side walls 30. Forward end portions of the lever extend through the guide body chamber 52. The rockable levers include slots 55 at the front end thereof which engage the guide element projections 48 of the upper electrode elements. An elongated block 60 is pivotally supported on the shaft 56 and this elongated block extends rearwardly from the shaft on either side of the rockable levers. Tension springs 62 extend through bores 64 in the block and are anchored at their opposite ends to a rod 66 which extends across the top of the block and to projecting pins 68 integral with the rockable levers whereby the right ends of the rockable levers are forcefully and independently urged toward the block 60. Set screws 70 extend through the block and engage the rearward ends of the rockable levers. As can be appreciated these set screws 70 enable the upper electrode elements to be vertically adjusted so that they will have the same vertical position relative to each other and also enables the elements to be adjusted so as to assure maximum elevation of the probes without the tops thereof striking the upper stops 53. The block has a rearwardly extending arm 72 which carries a rotatable cam follower 74 which engages a related cam 76 secured to a cam shaft 78 journalled in the rear portions of the side walls 30. Tension springs 80 extend upwardly from the forward end portions of the rockable levers to a member 82 which extends across the top of the housing to urge the rockable levers and hence the block to rotate in the clockwise direction as viewed in FIG. 2 and thereby maintain the cam follower roller in contact with the periphery of the cam. The lower surface of the rockable lever slots engage the rectangular portions of the guilding elements 46 causing the upper electrode elements to be elevated upwardly.

As the control knobs 28 are rotated the block and rockable levers are rotated. The weight of the upper electrode elements maintains the guide element projections 48 of these elements resting on the bottom surface of the rockable lever slots 55 until these electrode elements are lowered into contact with the circuit board W. Further rotation of the control knobs brings the upper surface of the slots into forceful engagement with the top surfaces of the guide element projections whereby the circuit board is urged, as above described into planar engagement with the supporting surface 16 of the apparatus. The upper electrode elements are downwardly biased by the stretched springs 62 and accordingly a predetermined, controlled force can be achieved at the faces of the upper electrode elements.

The spaced lower electrode elements 18 are secured to rod elements 86 which extend downwardly through and are secured to individual insulating leaf springs 87. Cylindrical spring elements 88 are compressively located intermediate the insulating leaf springs and a shelf 94 which extends across the bottom of the base 16. The resilient nature of the spring element 88 and the insulating leaf spring 87 normally urges the lower electrode elements upwardly to project beyond the top surface of the work surface. The shelf 94 acts as a lower stop limiting the downward displacement of the lower electrode elements.

Figure 4:
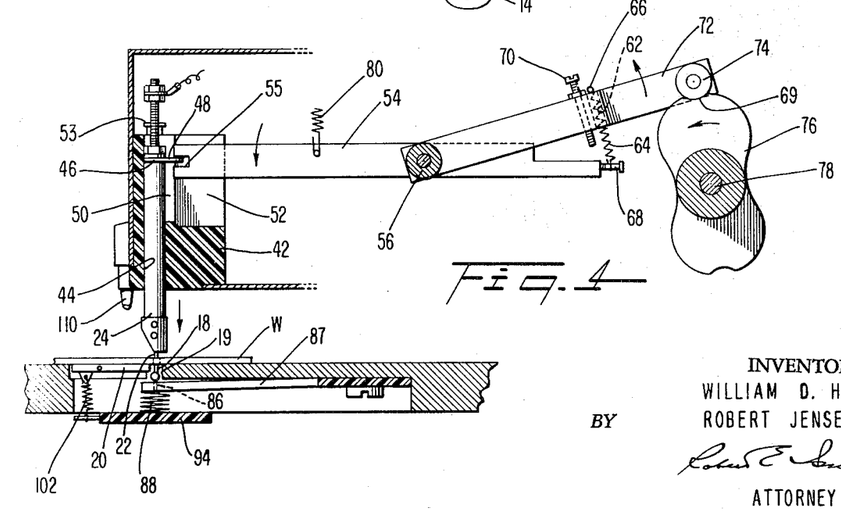
FIG. 4 is a skeletonized showing of certain of the apparatus elements as illustrated in FIG. 2, with the upper electrode probe elements disposed in operative relationship with a plated thru-hole in a printed circuit board.
Figure 5:
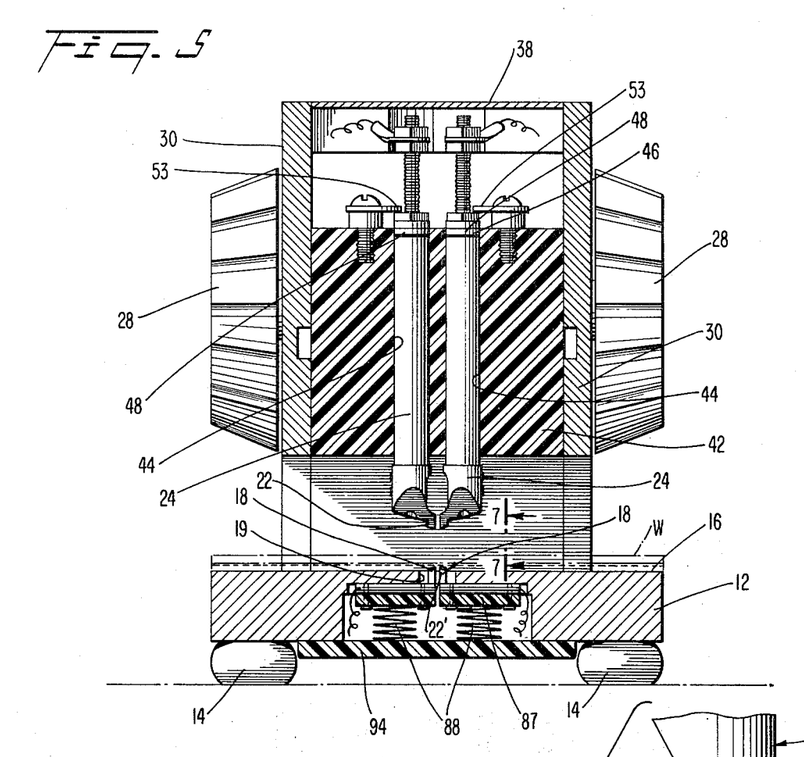
FIG. 5 is a vertical section taken on the lines 5—5 of FIG. 3.

As an aid to positioning the workpiece W on the work surface the ease-on ramp or guard 20 is provided which elevates the workpiece W over the lower electrode elements 18. As can be seen from FIGS. 1 and 2 the ease-on ramp is pivotally mounted and is biased by a spring element 102 which extends between one end of the ease-on ramp and the base shelf 94 to rotate the end thereof adjacent the lower contact pair upwardly to at least the height of the lower electrode elements when the probe assembly is in the inoperative condition. The force of the downwardly urged upper electrode elements will be sufficient to lower the workpiece W, the upwardly biased ease-on platform 20 and the upwardly biased lower electrode elements 18 into the operational condition as illustrated in FIG. 4 with the workpiece in planar engagement with the work surface 16.

Figures 6, 7:
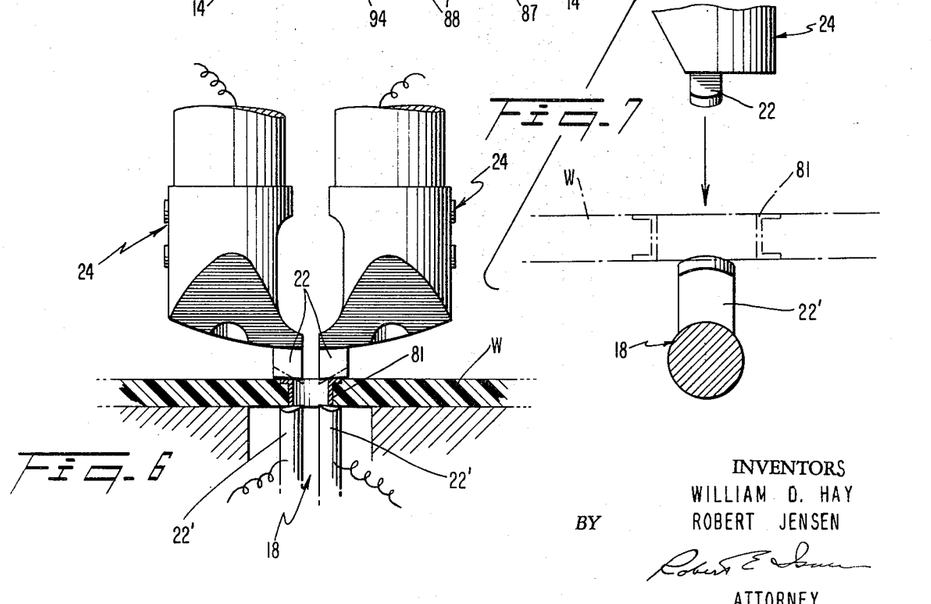
FIG. 6 is an enlarged elevation of the electrode probe elements disposed in operative engagement with a plated thru-hole in a printed circuit board.
FIG. 7 is an elevation taken at the lines 7—7 of FIG. 5.

To achieve an extremely high degree of accuracy and reproducibility in the desired measurements the upper 24 and lower 18 pairs of electrode elements include contact members 22, 22f selectively contoured to establish essentially point contact with the inner diametral edges of the top and bottom surface of the thruhole plating 81 being measured. To accomplish this the contact surfaces of the contact members are angled in the transverse direction (FIG. 6) relative to the plane of the work surface. This angle may be as small as 5° as illustrated or can be substantially larger (for example 60° or more) where required. An angle of 30° is illustrated by the dotted line in FIG. 6. The inclination of the upper pair of contact members establishes therebetween a flattened V configuration and the lower pair of contact members are similarly inclined establishing therebetween an inverted flattened V configuration with the imaginary bottom and top of the V and inverted V as well as the bottommost points of the upper and lower contacts being vertically aligned. The longitudinal cross-section of each of the contacts as illustrated in FIG. 7 is circular and the lowermost points thereof extending transversely across the upper and lower contacts lie in a single vertical plane.

The transverse spacing between the two contacts of each pair may be fixed and may be as small as desired. With thru-hole platings having a diameter at least as large as the spacing between the upper and lower contact pairs essentially point contact at each of four spots on the sample - two on either face of the board at opposite ends of a diameter of the thru-hole plating being measured and precisely at the edge of the thru-hole will be established.

In order to obtain such highly accurate and reproducible readings, it is important to position the probe assembly as accurately as possible so that four point contact as above described will be achieved. Accordingly, a light 110 and a magnifying lens 112 suitably secured to the testing apparatus are provided giving the operator a large and illuminated view of the thru-hole being measured. To this end the feet of the upper electrode elements are inclined downwardly from front to back so that they will not obstruct the view of the upper contacts.

Figure 8:
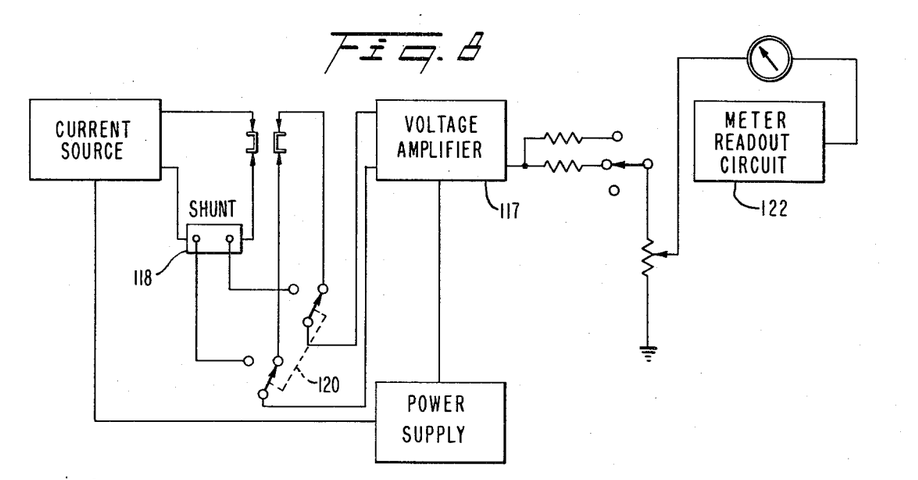
FIG. 8 is a block diagram of the major circuit components included in the apparatus illustrated in FIG. 1.

Referring to FIG. 8 the input circuit is a high gain, low noise operational amplifier 117. The circuit is arranged for common mode operation with a medium input impedance and a typical gain of 175. The circuit board being tested is accordingly immune to voltage potentials between the circuit board and ground and also to any other electrical noise in the air. The leads 114 running from the testing apparatus 10 to the read-out meter 40 are twisted pairs with the voltage measuring leads being twisted separately from the current inducing leads to eliminate any pickup between the input and output leads.

An internal shunt 118 is positioned in series with the input current inducing lead which is utilized to calibrate the system. A spring loaded switch 120 enables the operator to switch the amplifier input from the electrical contacts to the know or standard resistance internal shunt output. The read-out unit 40 is then set by means of the calibration control to directly read the resistance of the internal shunt. A thru-hole plating of the circuit board can then be measured.

The meter circuit includes a high gain operational amplifier (not shown) 122, which is of conventional construction, desirably in which the meter is connected in the feedback loop through a Diode bridge. The initial gain of this stage typically is 1000 until the output reaches the breakover point of the diodes in the bridge. At that time the gain is reduced typically to two and one half. This enables linear readings from zero to 100 micro-amperes without having to offset the meter zero reading.

Figure 9:
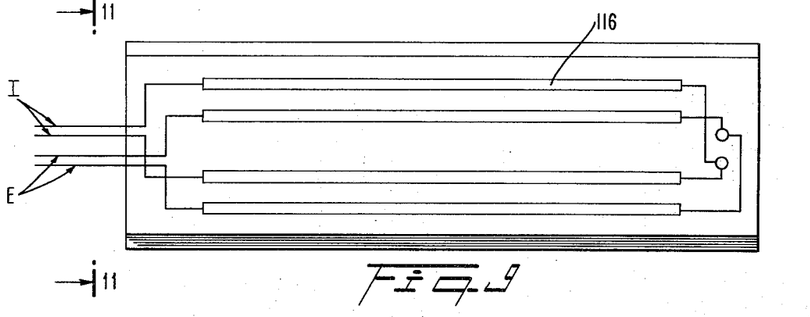
FIG. 9 is a schematic view of the wiring system employed in the probe stand.
Figure 10:
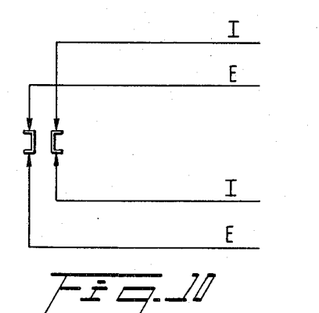
FIG. 10 is a simplified wiring diagram of the electrical connection to the electrode probe elements.
Figure 11:
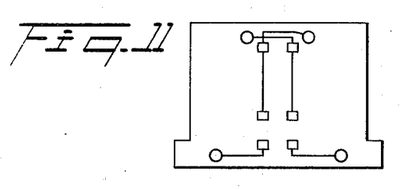
FIG. 11 is a view of the wiring arrangement as viewed from the line 12—12 of FIG. 11.
Figure 12:
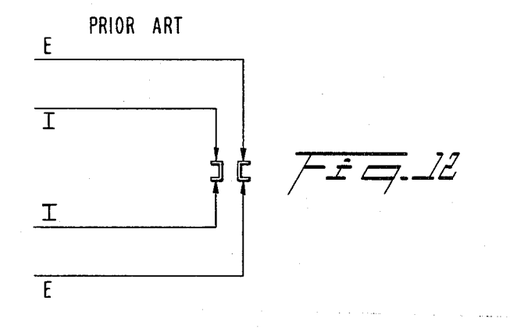
FIG. 12 is a simplified wiring diagram of a prior art technique for feeding current to and measuring the voltage drop across a circuit board thru-hole.

The current and voltage leads are twisted from the plug of the cable up to the probe stand or housing and are then run in steel shielding tubes 116 (FIG. 9) and wired diagonally opposite each other (FIGS. 10 and 11), i.e. the voltage leads define a plane which is substantially perpendicular to the plane defined by the current leads. This technique as compared to prior art practice illustrated in FIG. 12 substantially eliminates all errors in measurement arising from transformer action (the coupling through the air of the current loop to the voltage pick-up loop.)

Having thus described our invention, we claim:

1. An apparatus for measuring the conductivity of a plated coating on a thru-hole in a circuit board workpiece comprising a planar supporting platform defining a measurement station and adapted to support a circuit board workpiece having a thru-hole with a plated coating disposed in overlying relation therewith, a first pair of independently resiliently mounted displaceable electrode elements disposed in closely spaced positional relation beneath said platform and each adapted to engage a marginal defining edge of the bottom of said thru-hole disposed at said measurement station, a second closely spaced pair of displaceable electrode elements selectively disposed in longitudinal coalignment with said electrode elements of said first pair thereof above said platform and each adapted to engage a marginal defining edge of the top of said thru-hole, means for lineally displacing said second pair of electrode elements intermediate a retracted position remote from said first pair of electrode elements and an advanced position in operative engaged relationship with the upwardly disposed defining edge of said plated thru-hole on an interposed workpiece supported by said platform, and means for independently resiliently mounting said second pair of electrode elements when in advanced position so that the pplated marginal defining edges of the thru-hole in the interposed workpiece engaged by said first and second pairs of electrode elements are subjected to a substantially uniform and reproduceable magnitude of compressive force during the measurement operation.

2. A measuring apparatus according to claim 1 wherein each electrode element of said second pair of electrode elements includes cylindrical probe means having terminal contact segments thereon, each of said contact segments having contoured surface means for selectively engaging the inner edge of the top surface of the thru-hole plating being measured and defining, in a plane parallel to a plane defined by the axes of said cylindrical probes, an acute angle with the surface of an interposed workpiece and having, in a plane perpendicular to said first mentioned plane, a circular contour, and wherein each electrode element of said first pair of electrode elements includes terminal contact segments having contoured surface means defining, in a plane parallel to the plane defined by said axes, an acute angle with the interposed workpiece and having, in a plane perpendicular to said plane, a circular contour whereby when said first and second pairs of electrode elements are brought into engagement with the inner edges of the top and bottom surfaces of the thru-hole plating, each of said first and second contoured surface means will establish essentially point contact with the thru-hole plating.

3. A measuring apparatus according to claim 3 wherein said terminal contact segments of said first and second pair of electrode elements define, in the plane parallel to the plane defined by the axes of the cylindrical probes, symmetrical V-shaped and inverted V-shaped terminal portions respectively and wherein the imaginary bottom and top of the V and inverted V configurations respectively are vertically aligned.

4. A measuring apparatus according to claim 2 wherein the lowermost points of curvature transversely across the contoured surface means of each of said first and second electrode elements define a vertical plane.

5. A measuring apparatus aaccording to claim 2 wherein the points of contact between said second electrode elements and the top surface of a thru-hole plating in a horizontally disposed workpiece are vertically above the points of contact between said first electrode elements and the bottom surface of said thru-hole plating.

6. A measuring apparatus according to claim 1 wherein said lineally displacing means includes means for independently varying the retracted position of each of said second electrode elements.

7. A measuring apparatus according to claim 6 further comprising
means for biasing said first pair of electrode elements upwardly to extend beyond the surface of said supporting means.

8. A measuring apparatus according to claim 7 further comprising means for preventing the striking of a workpiece against said first electrode elements when the workpiece is introduced into interposed relation between said first and second electrode elements.

9. A measuring apparatus according to claim 8 wherein said apparatus further comprises magnification means and illuminating means disposed adjacent to said measuring station for facilitating manual positioning of a plated thru-hole in a workpiece in the path of advance of said electrode elements.

10. An apparatus for measuring the integrity and thickness of a thru-hole plating according to claim 1, further comprising an elongated housing, a first spaced pair of individually shielded electrical leads joined to one set of said first and second electrode elements and extending longitudinally of said housing in parallel relation to each other and a second spaced pair of shielded electrical leads joined to the other set of said first and second electrode elements and extending longitudinally of said housing in parallel relation to each other, said first and second spaced pairs of shielded electrical leads being so positioned that a plane containing said first pair of electrical leads will be disposed substantially perpendicular to a plane containing said second pair of electrical leads.

11. An apparatus for measuring the integrity and thickness of a thru-hole plating according to claim 10 further comprising a readout unit for supplying a constant electrical current to one set of first and second electrode elements and means for measuring the voltage drop across said other set of first and second electrode elements, said means including a high gain input circuit feeding a low noise amplifier arranged for common mode operation and indicating means responsive to the output of said amplifier for visually displaying the magnitude of said voltage drop.

* * * * *

UNITED STATES PATENT OFFICE
CERTIFICATE OF CORRECTION

Patent No. 3,766,470            Dated October 16, 1973

Inventor(s) William D. Hay et al.

It is certified that error appears in the above-identified patent and that said Letters Patent are hereby corrected as shown below:

Column 5, line 58, after "circuit" insert -- 122, which is of conventional construction, desirably --; line 59, delete "122, which is of conventional"; line 60, delete "construction, desirably";

Column 6, line 4, change "pplated" to -- plated --.

Signed and Sealed this

Tenth Day of January 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No. 3766470        Dated October 16, 1973

Inventor(s) William D. Hay, et al

It is certified that error appears in the above-identified patent and that said Letters Patent are hereby corrected as shown below:

Column 5, line 58, after "circuit" insert --122, which is of conventional construction, desirably--;

line 59, delete "122, which is of conventional";

line 60, delete "construction, desirably";

Column 6, line 41, change "pplated" to --plated--.

This certificate supersedes certificate issued January 10, 1978.

Signed and Sealed this

Sixteenth Day of May 1978

[SEAL]

Attest:

RUTH C. MASON
Attesting Officer

LUTRELLE F. PARKER
Acting Commissioner of Patents and Trademarks